(12) United States Patent
Janow et al.

(10) Patent No.: US 12,207,670 B2
(45) Date of Patent: Jan. 28, 2025

(54) NUTRITIONAL COMPOSITIONS FROM BREWERS' SPENT GRAIN AND METHODS FOR MAKING THE SAME

(71) Applicant: Axiom Foods, Inc., Los Angeles, CA (US)

(72) Inventors: David J. Janow, Los Angeles, CA (US); Richard J. Ray, Sacramento, CA (US)

(73) Assignee: Axiom Foods, Inc., Los Angeles, CA (US)

( * ) Notice: Subject to any disclaimer, the term of this patent is extended or adjusted under 35 U.S.C. 154(b) by 0 days.

(21) Appl. No.: 18/390,964

(22) Filed: Dec. 20, 2023

(65) Prior Publication Data

US 2024/0114925 A1 Apr. 11, 2024

Related U.S. Application Data

(63) Continuation of application No. 17/533,571, filed on Nov. 23, 2021, which is a continuation-in-part of application No. PCT/US2020/035682, filed on Jun. 2, 2020.

(60) Provisional application No. 63/119,181, filed on Nov. 30, 2020, provisional application No. 62/928,586, (Continued)

(51) Int. Cl.
| | |
|---|---|
| *A23K 10/38* | (2016.01) |
| *A23K 30/20* | (2016.01) |
| *C11B 1/04* | (2006.01) |
| *C11B 13/00* | (2006.01) |
| *C12F 3/10* | (2006.01) |

(52) U.S. Cl.
CPC ............ *A23K 10/38* (2016.05); *A23K 30/20* (2016.05); *C11B 1/04* (2013.01); *C11B 13/00* (2013.01); *C12F 3/10* (2013.01)

(58) Field of Classification Search
CPC .......... A23K 10/38; A23K 30/20; C11B 1/04; C11B 13/00; C12F 3/10
See application file for complete search history.

(56) References Cited

U.S. PATENT DOCUMENTS

| 4,377,601 A | 3/1983 | Dreese et al. |
| 4,820,529 A | 4/1989 | Uchida et al. |
| 2012/0219667 A1 | 8/2012 | Kelly et al. |

(Continued)

FOREIGN PATENT DOCUMENTS

| CA | 3030858 A1 * | 1/2018 | ................ A23J 1/12 |
| CN | 101199313 A | 6/2008 | |

(Continued)

OTHER PUBLICATIONS

Celus et al., "Enzymatic Hydrolysis of Brewers' Spent Grain Proteins and Technofunctional Properties of the Resulting Hydrolysates", Journal of Agricultural and Food Chemistry, 2007, vol. 55, No. 21, pp. 8703-8710.

(Continued)

*Primary Examiner* — Deborah D Carr
(74) *Attorney, Agent, or Firm* — Knobbe, Martens, Olson & Bear LLP (57) ABSTRACT

Disclosed herein are embodiments for the isolation of fiber and protein from brewers' spent grain. In some embodiments, the protein has a reduced fat content. In some embodiments, the protein has an improved Protein Digestibility Corrected Amino Acid Score.

15 Claims, 2 Drawing Sheets

Related U.S. Application Data filed on Oct. 31, 2019, provisional application No. 62/856,550, filed on Jun. 3, 2019.

(56) References Cited

U.S. PATENT DOCUMENTS

| | | |
|---|---|---|
| 2015/0208688 A1 | 7/2015 | Mackay |
| 2022/0151260 A1 | 5/2022 | Janow et al. |

FOREIGN PATENT DOCUMENTS

| | | |
|---|---|---|
| CN | 101595939 A | 12/2009 |
| CN | 102911992 A | 2/2013 |
| CN | 104171260 A | 12/2014 |
| CN | 107549728 A | 1/2018 |
| CN | 107897942 A | 4/2018 |
| CN | 111254178 A | 6/2020 |
| CN | 111574618 A | 8/2020 |
| CN | 114711362 A | 7/2022 |
| EP | 169068 | 1/1986 |
| EP | 0 369 818 | 5/1990 |
| WO | WO 2014/027139 A1 | 2/2014 |
| WO | WO 2018/209131 | 11/2018 |
| WO | WO 2020/247363 | 12/2020 |
| WO | WO 2021/007565 | 1/2021 |
| WO | WO 2023/096861 | 6/2023 |

OTHER PUBLICATIONS

PDCAAS Statement, Axiom Foods, global Plant Proteins & Ingredients From Innovation to Supply, pp. 1-3, updated Mar. 22, 2023.
Treimo et al., "Enzymatic Solubilization of Proteins in Brewer's Spent Grain", Journal of Agricultural and Food Chemistry, 2008, vol. 56, No. 13, pp. 5359-5365.

\* cited by examiner

Fig. 1

Table 1: Complete Protein Requirement Categories

| Essential Amino Acids | OLDER CHILD THRU ADULT<br>Complete Protein Requirement - FAO/WHO older child, adolescent; & adult mg/g protein pattern | CHILD (6 MOS – 3 YEARS)<br>Complete Protein Requirement - FAO/WHO child (6 months to 3 years) mg/g protein pattern | INFANT (BIRTH – 6 MOS)<br>Complete Protein Requirement - FAO/WHO infants (birth to 6 months) mg/g protein pattern |
|---|---|---|---|
| Tryptophan | 6.6 | 8.5 | 17 |
| Threonine | 25 | 31 | 44 |
| Isoleucine | 30 | 32 | 55 |
| Leucine | 61 | 66 | 96 |
| Lysine | 48 | 57 | 69 |
| Methionine+Cystine | 23 | 27 | 33 |
| Phenylalanine+Tyrosine | 41 | 52 | 94 |
| Valine | 40 | 43 | 55 |
| Histidine | 16 | 20 | 21 |

Findings and Recommendations of the 2011 FAO Expert Consultation on Protein Quality Evaluation in Human Nutrition
FAO Food and Nutrition Paper #92 "Dietary Protein Quality Evaluation in Human Nutrition" Apr 2011.

Fig. 2

NUTRITIONAL COMPOSITIONS FROM BREWERS' SPENT GRAIN AND METHODS FOR MAKING THE SAME

CROSS REFERENCE TO RELATED APPLICATIONS

This application is a continuation of U.S. application Ser. No. 17/533,571, filed Nov. 23, 2021, which claims the benefit of priority to U.S. Provisional Patent Application No. 63/119,181, filed Nov. 30, 2020. U.S. application Ser. No. 17/533,571 is also a continuation-in-part of International Application No. PCT/US2020/035682, filed Jun. 2, 2020, which claims the benefit of priority to U.S. Provisional Patent Application No. 62/928,586, filed Oct. 31, 2019, and U.S. Provisional Patent Application No. 62/856,550, filed Jun. 3, 2019. All of the foregoing applications are fully incorporated herein by reference in their entireties for all purposes.

BACKGROUND

Field

Disclosed herein are methods isolating and making nutritional compositions from grain.

Description of the Related Art

Brewers' spent grain (BSG) is a by-product generated in the beer-brewing process consisting of barley grain husks obtained as solid residue after the production of the liquid extracted from the mashing process during the brewing of beer (e.g., wort). The main use for the elimination of BSG is animal feed.

SUMMARY

Some embodiments disclosed herein pertain to methods method of preparing protein isolate from brewers' spent grain (BSG), compositions comprising BSG, and methods of using BSG for nutritional supplementation. In some embodiments, a method of preparing BSG protein isolate is provided. In some embodiments, a mixture of BSG in water is prepared. In some embodiments, starch in the BSG is digested using an enzyme. In some embodiments, the protein is solubilized to provide a protein solution with insoluble fiber. In some embodiments, insoluble fiber is removed from the protein solution with insoluble fiber to provide a protein solution. In some embodiments, a protein fraction is precipitated from the protein solution. In some embodiments, the protein fraction is dried after precipitation to provide the protein isolate. In some embodiments, the protein fraction is precipitated from the protein solution by acidifying the protein solution. In some embodiments, the enzyme used to digest the starch is a starch enzyme. In some embodiments, the BSG in water mixture is sonicated (e.g., during enzymatic treatment). In some embodiments, the protein is not treated with a protease. In some embodiments, the insoluble fiber is removed from the solution of solubilized protein using a sieve bend filter with or without recirculation of the solution of solubilized protein. In some embodiments, insoluble fiber is removed from the solution of solubilized protein by decanting. In some embodiments, the protein fraction is treated with hydrogen peroxide thereby providing a protein isolate. In some embodiments, the protein fraction is treated with a lipophilic solvent to remove fat from the protein fraction thereby providing a reduced fat protein isolate.

Some embodiments pertain to a method of isolating protein and/or fiber from brewers' spent grain. In some embodiments, starch in the BSG is digested. In some embodiments, protein from the BSG is solubilized (e.g., using alkaline conditions). In some embodiments, insoluble fiber is removed from a solution of the solubilized protein. In some embodiments, the protein precipitated. In some embodiments, the protein is precipitated by acidifying the solution of the solubilized protein. In some embodiments, the protein is spray dried after precipitation. In some embodiments, the starch is digested using a starch enzyme. In some embodiments, the insoluble fiber is removed from the solution of solubilized protein using a DSM filter with or without recirculation of the solution of solubilized protein. In some embodiments, the protein is treated with hydrogen peroxide. In some embodiments, the hydrogen peroxide treatment improves the PDCAAS of the protein.

Some embodiments pertain to a BSG protein isolate made by a method as described above or elsewhere herein. Some embodiments pertain to a BSG protein isolate comprising at least 80% protein. Some embodiments pertain to a BSG protein isolate comprising at least 25% fat. Some embodiments pertain to a BSG protein isolate comprising at least 50% protein. In some embodiments, the protein isolate comprises less than 10% fiber. In some embodiments, the Protein Digestibility Corrected Amino Acid Score is equal to or at least about 0.98. In some embodiments, the BSG based protein isolate includes greater than or equal to 6.6 mg tryptophan/g protein, greater than 25 mg threonine/g protein, 30 mg isoleucine/g protein, 61 mg leucine/g protein, 48 mg lysine/g protein, 23 mg methionine+cysteine/g protein, 41 mg phenylalanine+tyrosine/g protein, 40 mg valine/g protein, and/or 16 mg histidine/g protein.

Some embodiments pertain to a nutritional supplement comprising the protein isolate as described above or elsewhere herein. Some embodiments pertain to a method of supplementing the diet of a subject, the method comprising providing the subject the nutritional supplement as described above or elsewhere herein.

DETAILED DESCRIPTION

Some embodiments pertain to processes of isolating macronutrients from Brewers' spent grain (BSG). In some embodiments, food grade grain (e.g., barley/rice) protein concentrates are prepared from BSG. BSG is the insoluble residue of grain (e.g., barley malt) resulting from the manufacture of wort. Wort is the liquid extracted from the mashing process during the brewing (e.g., of beer, whisky, or the like). Wort contains the sugars, the most important being maltose and maltotriose, that will be fermented by the brewing yeast to produce alcohol. Although it is the main byproduct of the brewing industry, BSG has received little attention as a marketable commodity and is mainly used as animal feed or as a starting point for ethanol production. BSG is prepared in large quantities, but nutritional components of any value are difficult to isolate from the bulk of useable components. Additionally, BSG rots quickly, making its use for purposes other than as, for example, animal feed difficult. Some embodiments disclosed herein solve one or more of these problems or others. Some embodiments pertain to the isolation of nutritional components from BSG (e.g., the proteins, amino acids, starches, sugars, and combinations thereof). In some embodiments, as disclosed elsewhere herein, BSG protein concentrate is prepared by an extraction and precipitation process. In some embodiments, an alkaline extraction of BSG is performed followed by an acid precipitation. While in some embodiments, proteases are used in the processing of BSG protein (and/or other BSG macronutrient products), in other embodiments, advantageously, proteases are not used. In some embodiments, a protein concentrate of >80% protein was obtained without the use of proteases. In some embodiments, the methods disclosed herein are suitable for BSG that from grains such as barley, wheat, rice, flaxseed, coconut, pumpkin, hemp, pea, chia, lentil, fava, potato, sunflower, quinoa, amaranth, oat, sorghum, millet, teff, combinations thereof, or the like.

As used herein, the term "weight percent," when referring to a component, is the weight of the component divided by the weight of the composition that includes the component, multiplied by 100%. For example the weight percent of component A when 5 grams of component A is added to 95 grams of component B is 5% (e.g., 5 g A/(5 g A+95 g B)×100%).

As used herein, the term "protein isolate" is to be interpreted broadly and includes compositions containing protein (including intact proteins, polypeptides, oligopeptides, and/or amino acids) that have been harvested from BSG protein sources. The term protein isolate includes concentrates and hydrolysates. The term protein isolate also may include amino acids (whether in monomeric, oligomeric, or polymeric form) that have been concentrated or processed from their native sources via hydrolysis, enzymatic degradation, fermentation, and/or other techniques. In some embodiments, a protein isolate comprises at least about 30%, 40%, 50%, 60%, 70%, 80%, 90%, 95%, 100%, protein by weight, or ranges including and/or spanning the aforementioned values. In some embodiments, a protein isolate comprises at least about 90% protein by weight.

As used herein, the term "protein concentrate" means compositions containing protein (including intact proteins, polypeptides, oligopeptides, and/or amino acids) that have been harvested from naturally occurring protein sources and that have at least 80% protein by weight.

As used herein, the term "protein" is to be interpreted broadly and includes intact proteins, polypeptides, oligopeptides, amino acids, and mixtures thereof.

As used herein, the term "subject" is to be interpreted broadly and includes animals, patients, athletes, and infants. As used herein, the term "animals" is to be interpreted broadly and includes, but is not limited to mammals, such as, humans, mice, rats, cats, dogs, livestock (e.g. pigs, cows), horses, monkeys, and apes, birds (e.g. chickens), reptiles, and amphibians. As used herein, the term "athlete" is given its ordinary definition and also broadly includes people performing exercise for training, maintaining health, general health improvement, and for rehabilitation. As used herein, the term "geriatric" is given its plain and ordinary meaning and is intended to include people over the age of 60.

As used herein, the term "dry weight" means the weight of a solid, semi-solid, or oil without water.

As used herein, the term "fiber" means a type of carbohydrate that the a subject does not digest. Though most carbohydrates are broken down into sugar molecules, fiber cannot be broken down into sugar molecules, and instead it passes through the body undigested.

Though the market for plant-based protein concentrates is large and growing, the use of BSG as a protein source is largely undeveloped. The sustainability of plant-based proteins and the effects of the carbon footprint and some of the main driving forces for the growth in the market. Plant-based proteins have an amino acid score that is less than other more common proteins, but because of its unique profile, can serve as a better protein in certain functional applications. For instance, because of the high leucine content, this makes for a nice bread additive. Leucine can enhance bread aroma when cooking etc. Though the market for plant-based protein concentrates is large and growing, the use of BSG as a protein source is largely undeveloped. BSG as a protein source has yet to be exploited because method for isolating it are inefficient and ineffective. Moreover, the digestibility, PDCAAS, and flavor profile make it inferior to animal based protein sources. Some embodiments disclosed herein provide a BSG-based protein isolate (e.g., a protein isolate that is isolated from BSG) that addresses one or more of the foregoing problems. By preparing protein isolate using one or more processes as disclosed herein, an improved protein isolate is provided.

In some embodiments, as disclosed herein, other BSG macronutrient isolates (e.g., carbohydrates and fats fractions in addition to protein) may also be harvested. In some embodiments, using the methods disclosed herein, compositions that have unique flavor and compositional profiles, with beneficial properties are provided. In some embodiments, the disclosed protein isolates (or other macronutrient products) are useful as food additives and food products. In some embodiments, both starch and protein fractions are isolated from the BSG starting materials. In some embodiments, the methods disclosed herein allow continuous processing of BSG and isolation of protein materials.

Methods of Manufacture

Some embodiments pertain to the isolation of starch, protein, fibers, and mixtures thereof from BSG. In some embodiments, BSG is acquired (e.g., as a starting material). In some embodiments, the BSG is acquired from a brewing facility. In some embodiments, the starch fraction of BSG is separated from the protein fraction of BSG by treating a BSG starting material using one or more of the steps disclosed herein (e.g., material that has not been pretreated to remove macronutrient isolates).

In some embodiments, the BSG comprises spent grain from one or more of barley, malts, wheat, rice, flaxseed, coconut, corn, rye, pumpkin, hemp, pea, chia, lentil, fava, potato, sunflower, quinoa, amaranth, oat, sorghum, millet, teff, combinations or mixtures thereof, or the like. Thus, in some embodiments, the product compositions (e.g., isolates) disclosed herein are prepared using such BSG products (e.g., from grains such as barley, malts, wheat, rice, flaxseed, coconut, corn, rye, pumpkin, hemp, pea, chia, lentil, fava, potato, sunflower, quinoa, amaranth, oat, sorghum, millet, teff, combinations or mixtures thereof, or the like).

In some embodiments, the BSG starting material is provided from or is entirely from a single grain and/or a single brewing source (from the brewing of a specific beverage, e.g., lager beer). In some embodiments, more than one BSG type can be used as a starting material (e.g., mixtures of one or more BSG starting materials). For example, BSG from a lager beer brewing process can be mixed with one or more other BSG types (e.g., spent grain from sake) as a starting material for the processes disclosed herein (which result in, for example protein and starch products, as disclosed herein). For brevity, the term BSG is used throughout this disclosure to refer to any one of these grains or any mixtures of BSG grain products. As used herein, BSG should be understood to include spent grain from any one or more of these grain sources (e.g., barley, wheat, rice, flaxseed, coconut, pumpkin, hemp, pea, chia, lentil, fava, potato, sunflower, quinoa, amaranth, oat, sorghum, millet, teff, combinations thereof, or the like). In some embodiments, the BSG is grain or grain mixture that is a waste material from the preparation of one or more of the following brewed beverages: Pale Lager, Pilsner, Dark Lager, German Bock, Brown Ale, Pale Ale, India Pale Ale, Porter, Stout, Belgian-Style Ale, Wheat Beer, Wild & Sour Ale, sake, or combinations thereof.

In some embodiments, as disclosed elsewhere herein, the BSG starting material may be from (e.g., is produced by brewing with) a mix of different brewing grains. In some embodiments, the BSG is sourced from a brewer's grain that comprises barley in an amount (by dry weight percent relative to the entire amount of brewer's grain) that is equal to or at least about: 10%, 30%, 40%, 50%, 60%, 80%, 90%, 95%, 100%, or ranges including and/or spanning the aforementioned values. In some embodiments, the BSG is sourced from a brewer's grain that comprises wheat in an amount (by dry weight percent relative to the entire amount of brewer's grain) that is equal to or at least about: 5%, 10%, 30%, 40%, 50%, 60%, 80%, 90%, 95%, 100%, or ranges including and/or spanning the aforementioned values. In some embodiments, the BSG is sourced from a brewer's grain that comprises rice in an amount (by dry weight percent relative to the entire amount of brewer's grain) that is equal to or at least about: 5%, 10%, 30%, 40%, 50%, 60%, 80%, 90%, 95%, 100%, or ranges including and/or spanning the aforementioned values. In some embodiments, the BSG is sourced from a brewer's grain that comprises hops in an amount (by dry weight percent relative to the entire amount of brewer's grain) that is equal to or at least about: 5%, 10%, 30%, 40%, 50%, 60%, 80%, 90%, 95%, 100%, or ranges including and/or spanning the aforementioned values. In some embodiments, the BSG is sourced from a brewer's grain that comprises corn in an amount (by dry weight percent relative to the entire amount of brewer's grain) that is equal to or at least about: 5%, 10%, 30%, 40%, 50%, 60%, 80%, 90%, 95%, 100%, or ranges including and/or spanning the aforementioned values.

One exemplary embodiment of the processing method may include one or more of the following materials and equipment: BSG (e.g., 100 lbs); Corn (e.g., 100 lbs); Fenton's Reagent; Water (e.g., at least or approximately 100°); 300 gallon tanks. In some embodiments, Fenton's Reagent is prepared by mixing concentrated hydrogen peroxide with an iron salt such as iron(III) chloride or iron(III) sulfate. In some embodiments, Fenton's reagent is a solution of hydrogen peroxide ($H_2O_2$) with ferrous iron (typically iron(II) sulfate, $FeSO_4$) as a catalyst can be used to oxidize contaminants or waste waters. In some embodiments, the method includes a step of adding Fenton's reagent.

One exemplary embodiment of the processing method may include one or more of the following materials and equipment: BSG (e.g., 100 lbs); Corn (e.g., 100 lbs); Validase BAA; Sodium Hydroxide; Hydrochloric acid (e.g., 35%); Hot water (e.g., at least or approximately 170°); 300 gallon tanks; DSM and pumps/hoses used to recirculate from DSM to tank; colloid mill, pump and piping—make sure to set up the piping with the 2½" line from the feed tank to the rotary lobe pump; empty 55 gallon drum or something similar to hold product in for multiple hours; CIP equipment before the test protocol is started. Other embodiments, material ratios, ingredients, and equipment can be used as would be readily understood in view of the disclosure herein.

Figure 1:
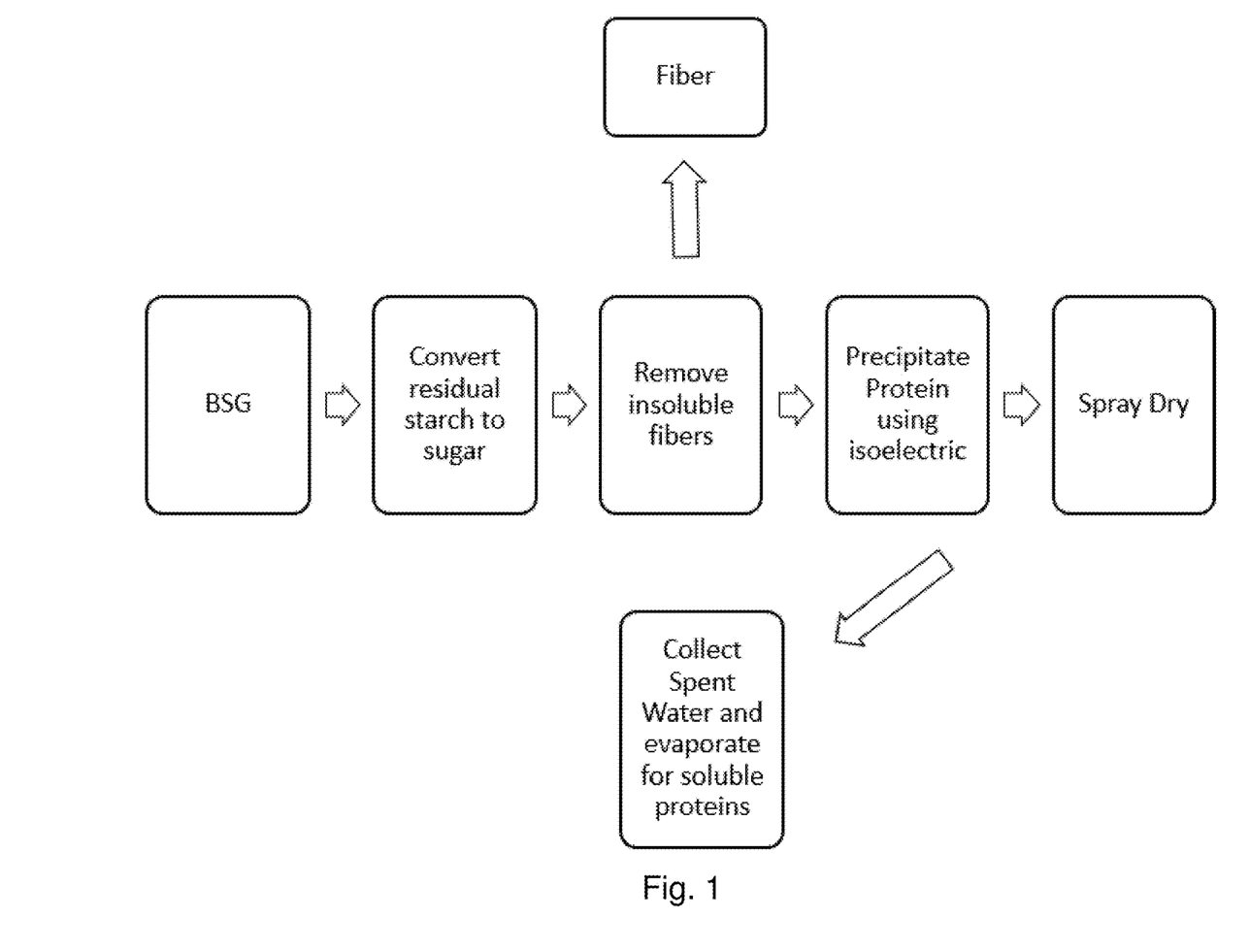
FIG. 1 is a flow chart for an embodiment of the conversion of a spent grain to useable proteins and fiber.

In some embodiments, as shown in FIG. 1, the method includes a starch conversion step. In some embodiments, starch conversion is accomplished using one or more of the following steps and/or pieces of equipment. In some embodiments, a colloid mill is used. In some embodiments, a pump is attached to the colloid mill to recirculate liquid through an agitating tank (e.g., having a capacity of equal to or at least about: 100 gallons, 200 gallons, 300 gallons, 400 gallons, 500 gallons, or ranges including and/or spanning the aforementioned values).

In some embodiments, ultrasound amplitude and sonication time have been employed to increase starch yields and conversions. Sonication can be performed using a sonicator. In some embodiments, the starch conversion process includes sonication. In some embodiments, it is believed that sonication has an effect on the structure of starch. In some embodiments, without being bound to a mechanism, it is believed that residual starch may crystallize or re-crystallize in BSG. In some embodiments, after the starch converts to its crystallized form, it is more difficult to convert to a sugar. In some embodiments, sonication facilitates break-up and breakdown of the crystals increasing the efficiency of starch conversion.

In some embodiments, water is provided (e.g., a weight of equal to or at least about: 100 lb, 200 lb, 300 lb, 400 lb, 500 lb, or ranges including and/or spanning the aforementioned values). In some embodiments, the water is heated (e.g., to a temperature of equal to or at least about: 100° F., 110° F., 120° F., 130° F., 140° F., 150° F., 160° F., 170° F., 180° F., 190° F., 200° F., 210° F., 212° F., or ranges including and/or spanning the aforementioned values). In some embodiments, for the starch conversion step, the weight percent of water compared to the total amount of dry ingredients is equal to or less than about: 50%, 60%, 70%, 80%, 90%, 99%, or ranges including and/or spanning the aforementioned values.

In some embodiments, validase is provided (e.g., a weight of equal to or at least about: 1 lb, 2 lb, 3 lb, 4 lb, 5 lb, or ranges including and/or spanning the aforementioned values). In some embodiments, the validase is mixed in the water for the starch conversion step.

In some embodiments, BSG is provided (e.g., a weight of equal to or at least about: 25 lb, 50 lb, 75 lb, 100 lb, 200 lb, 300 lb, 400 lb, 500 lb, or ranges including and/or spanning the aforementioned values). In some embodiments, the BSG is mixed in the water for the starch conversion step. In some embodiments, the weight percent of BSG in water is equal to or less than about: 1%, 2%, 3%, 4%, 5%, 20%, 30%, 40%, 50%, or ranges including and/or spanning the aforementioned values. For example, in some embodiments, the weight percent of BSG in the water ranges from 5% to 20%, 1% to 50%, 20% to 50%, etc. In some embodiments, the weight percent of enzyme in the water is equal to or less than about: 5%, 4%, 3%, 2%, 1%, 0.5%, 0.25%, 0.1%, or ranges spanning and/or including the aforementioned values. For example, in some embodiments, the weight percent of enzyme in the water ranges from 5% to 1%, 1% to 0.1%, etc.

In some embodiments, as disclosed elsewhere herein, validase may be used as a starch enzyme. In other embodiments, different starch enzymes or additional starch enzymes may be used (e.g., mixtures of more than one or more different starch enzymes with or without validase). In some embodiments, the starch enzyme (e.g., validase, etc.) is provided to convert BSG starch into shorter oligosaccharides, monosaccharides, or disaccharides. In some embodiments, a single starch enzyme is used. In some embodiments, a mixture of starch enzymes is used. In some embodiments, the enzyme(s) is an alpha-amylase. In some embodiments, the starch enzyme is selected from one or more of validase, cellulase, galactosidase, and glucanase. In some embodiments, the enzyme is an a-amylase (e.g., DSM Maxamyl HT, or the like). In some embodiments, one or more of the following enzymes are used in the process Maximal HT, Lacasse, Hemicellulase 90, Filtrase® NL, Cellulase A3, Alpha Galactosidase DS30, Gluczyme AF6, pullulanase, or combinations thereof. In some embodiments, the enzyme is provided (e.g., a weight of equal to or at least about: 1 lb, 2 lb, 3 lb, 4 lb, 5 lb, or ranges including and/or spanning the aforementioned values). In some embodiments, the enzyme is mixed in the water. In some embodiments, a starch degrading enzyme is added to water after the water has been heated (as disclosed herein). In some embodiments, BSG is provided (e.g., a weight of equal to or at least about: 25 lb, 50 lb, 75 lb, 100 lb, 200 lb, 300 lb, 400 lb, 500 lb, or ranges including and/or spanning the aforementioned values). In some embodiments, starch enzyme is added (to the water or to the water BSG mixture) to provide a solution having a weight ratio % of enzyme relative to the BSG starting material that is or will be equal to or less than about: 1.5%, 1.0%, 0.5%, 0.2%, 0.163%, 0.11%, 0.1%, 0.05%, 0.025%, 0.01% or ranges including and/or spanning the aforementioned values.

In some embodiments, the enzyme is added to water, then the BSG is added to the enzyme mixture. In other embodiments, the BSG is added to water, then the starch enzyme is added to the BSG mixture. In still other embodiments, the BSG is added to water, the starch enzyme is added to water, then the BSG and enzyme water mixtures are combined.

In some embodiments, the mixture of water, enzyme, and BSG is mixed. In some embodiments, the water mixture (e.g., including the BSG and enzyme) agitated using stirring. In some embodiments, a baffle is used to increase mixing. In some embodiments, any agitation system that is configured to reduces particle size of solid particles may be used. In some embodiments, the agitator used is on that is configured to provide non-fiber particles having an average diameter of equal to or less than about: 500 μm, 250 μm, 100 μm, 50 μm, 10 μm, 1 μm, or ranges including and/or spanning the aforementioned values. In some embodiments, the mixture is circulated through a high-sheer mixer. In some embodiments, the mixture is recirculated through a colloid mill to an agitating tank. In some embodiments, a colloid mill can be used to reduce the particle size of the solid in suspension in a liquid. In some embodiments, the colloid mill works on the rotor-stator principle with a rotor that turns at high speeds (2000-18000 RPM). In some embodiments, the resulting high levels of hydraulic shear applied to the process liquid and/or disrupt structures in the fluid. In some embodiments, the colloid mill increases the stability of suspensions and emulsions, but can also be used to reduce the particle size of solids in suspensions.

In some embodiments the recirculation process is carried out for a period of time (e.g., 30 minutes, 1 hour, 2 hours, 3 hours, 4 hours, 5 hours, or ranges including and/or spanning the aforementioned values). In some embodiments, the water is heated during the agitation and/or recirculation process (e.g., to a temperature of equal to or at least about: 100° F., 110° F., 120° F., 130° F., 140° F., 150° F., 160° F., 170° F., 180° F., 190° F., 200° F., 210° F., 212° F., or ranges including and/or spanning the aforementioned values). In some embodiments, the after sufficient time has passed (allowing breakdown of the BSG starch), the reaction mixture is cooled (e.g., to a temperature of less than or equal to about: 100° F., 95° F., 90° F., 85° F., 80° F., 75° F., or ranges including and/or spanning the aforementioned values).

In some embodiments, after enzymatic treatment, the BSG starch products can be isolated. In some embodiments, after enzymatic treatment, the BSG starch products include one or more of maltose, glucose, sucrose and various branched carbohydrates. In some embodiments, after enzymatic treatment, sugars of variable dextrose equivalents (DE) are produced. These sugars can be isolated and used as food additives and in nutritional compositions as disclosed herein. In some embodiments, the enzymatic treatment converts starch to maltose. In some embodiments, the sugar product (e.g., maltose or other shorter chain sugars) has a DE of at least about 15 and up to less than or equal to 25 DE and/or up to less than or equal to 45 DE. In some embodiments, the enzymatic degradation of the brewer's grain based starting material is performed for a period of time sufficient to provide a DE of greater than or equal to about: 7, 15, 23, 24, 25, 43, 65, or ranges including and/or spanning the aforementioned values. In some embodiments, these starch products are isolated (e.g., by drying, etc.) for use in food products as disclosed elsewhere herein.

In some embodiments, after enzymatic treatment of the starch, protein is extracted. In some embodiments, additional water is provided (e.g., a weight of equal to or at least about: 100 lb, 200 lb, 300 lb, 400 lb, 500 lb, or ranges including and/or spanning the aforementioned values). In other embodiments, no additional water is added after cooling the starch containing mixture. In some embodiments, the weight percent of protein fraction in the water is adjusted to be equal to or less than about: 1%, 2%, 3%, 4%, 5%, 20%, 30%, or ranges including and/or spanning the aforementioned values. For example, in some embodiments, the weight percent of the BSG protein fraction in the water ranges from 5% to 20%, 1% to 30%, 20% to 30%, etc.

In some embodiments, the pH of the water comprising treated starch is adjusted to provide an alkaline solution (e.g., a pH of equal to or at least about: 7.5, 8, 9, 10, 11, 12, or ranges including and/or spanning the aforementioned values). In some embodiments, adjusting the pH, the protein fraction becomes soluble in solution, leaving a suspension of insoluble fiber. In some embodiments, the pH is adjusted using NaOH or another base (e.g., KOH, etc.). In some embodiments, the reaction mixture is mixed with the alkaline solution and the pH is adjusted to provide an alkaline solution (e.g., a pH of equal to or at least about: 7.5, 8, 9, 10, 11, 12, or ranges including and/or spanning the aforementioned values). In some embodiments, in addition to or as an alternative to an alkaline solution (e.g., a pH or equal to or at least about: 7, 8, 9, or ranges including and/or spanning the aforementioned values, or alkaline pH solutions as disclosed elsewhere herein) a protease enzyme is added. In other words, in some embodiments, a protease may be added to the alkaline solution. In some embodiments, a protease enzyme is not used and just an alkaline solution is used to hydrolyze the protein fraction (e.g., a pH or equal to or at least about 10 or alkaline pH solutions as disclosed elsewhere herein).

In some embodiments, where a protease is used, the protease may be an alkaline protease, neutral protease, or combination thereof. In some embodiments, the protease is an endoprotease (e.g., a serine endoprotease). In some embodiments, the protease is an exoprotease. In some embodiments, the weight ratio % of added protease (based on total dry protein weight) is less than or equal to about: 0.005%, 0.01%, 0.02%, 0.05%, 0.1%, 0.5%, 1.0%, or ranges including and/or spanning the aforementioned values.

In some embodiments, after solubilizing the protein fraction, fiber is removed from the mixture. In some embodiments, the alkaline reaction mixture is filtered and/or decanted. In some embodiments, filtration and/or decanting removes insoluble fiber residues. In some embodiments, the filtration is performed under a continuous recycling process where solids are removed, and the filtrate is then re-filtered. In some embodiments, the alkaline reaction mixture is filtered using a sieve bend filter. In some embodiments, the filtrate is collected and pumped back over the filter in a recirculation product until the solids (all or substantially all) have been removed from the alkaline reaction mixture. In some embodiments, other conventional filtration means can be used.

In some embodiments, fiber is removed from the mixture. In some embodiments, filtration and/or decanting removes insoluble fiber residues. In some embodiments, the filtration is performed under a continuous recycling process where solids are removed, and the filtrate is then re-filtered. In some embodiments, the reaction mixture is filtered using a sieve bend filter. In some embodiments, the filtrate is collected and pumped back over the filter in a recirculation product until the solids (all or substantially all) have been removed from the alkaline reaction mixture. In some embodiments, other conventional filtration means can be used.

In some embodiments, the cake is collected from the filter and/or from the decanted solution. In some embodiment, the insoluble fiber is isolated (e.g., by further filtration of the decanted liquid and/or by drying) and is used as a food or drink additive.

As noted above, in some embodiments, a sieve bend filter may be used to remove fiber. Dutch State Mines (DSM) filter screens are also known as sieve bends, after Dutch State Mines, who introduced the sieve bend as a static sizing screen having ten times greater capacity than conventional vibrating screens. They are mainly used for liquid/solid separation and manufactured to suit a wide range of industries such as Sugar, Coal Mining & Quarrying, Mineral Processing, Cement, and Industrial & Urban Effluent Treatment. Sieve bend screens are also used as a pre-filter in urban & industrial waste treatment plants to improve the performance of the clarifier by drastically reducing the load. In some embodiments, the DSM filters used for the fiber separation have a pore size of equal to or less than about: 0.001", 0.005", 0.008", 0.01", 0.015", 0.02", 0.05", 0.10" or ranges including and/or spanning the aforementioned values. In some embodiments, after larger solids are removed (e.g., using the sieve bend filter), the filtrate is allowed to settle for a period of time (e.g., 30 minutes, 45 minutes, 1 hour, 2 hours, 3 hours, 4 hours, 5 hours, or ranges including and/or spanning the aforementioned values). In some embodiments, the liquid is decanted to remove these additional fiber sediments. In some embodiments, after the bulk fiber is removed, the solution primarily comprises sugar, protein, and fats from the BSG.

In some embodiments, insoluble fibers pass through the sieve bend filter. In some embodiments, by letting the solution "rest", the fibers will drop out and form a cake. In some embodiments, decanting the top layer allows more efficient removal of the fiber and/or provided an additional or alternative method for removing fiber. In some embodiments, with the resting step, fiber can be reduced from equal to or over about 30%, 27%, or 25% to less than or equal to about: 5%, 4%, 3%, 2.5%, 2%, 1.5%, 1.0%, or ranges including and/or spanning the aforementioned values. In some embodiments, the process for separation removes fiber from the protein product at an efficiency (e.g., percent reduction) of greater than or equal to about: 45%, 60%, 80%, 95%, 98%, 99%, 99.5%, or ranges spanning and/or including the aforementioned values.

In some embodiments, as disclosed elsewhere herein, instead of or addition to filtering, decanting can be used to remove the insoluble fibers from the solubilized protein fraction. In some embodiments, it has been found that small particle fibers, when decanted, are removable.

In some embodiments, the decanted liquid, the filtrate, and/or supernatant comprising the protein fraction isolated is (e.g., transferred to new clean tank). In some embodiments, this separated liquid (comprising degraded starch sugars, protein, and fats from the BSG) is acidified. In some embodiments, the pH of the separated liquid is adjusted to provide an acidic solution (e.g., a pH of less than or equal to about: 6.5, 6.0, 5.5, 5.0, 4.5, 4.4, 4.0, 3.5, 3.0, 2.5, or ranges including and/or spanning the aforementioned values). In some embodiments, the separated liquid (comprising sugar, protein, and fats from the BSG) is acidified with HCl. In some embodiments, acidification causes proteins to precipitate from the solution. In some embodiments, the proteins comprise albumin proteins, globulin proteins, hordein proteins, and/or glutelin proteins.

In some embodiments, during the isolation of BSG proteins, the filtrate is held for a period of time without agitation (e.g., 2 hours, 4 hours, 8 hours, 12 hours, or ranges including and/or spanning the aforementioned values). In some embodiments, after acidification, the top layer of liquid (e.g., the supernatant) is removed (e.g., by decanting, etc.). In some embodiments, the bottom layer (comprising the precipitated proteins) is combined with additional acidic water (e.g., having a pH of less than or equal to about: 6.5, 6.0, 5.5, 5.0, 4.5, 4.4, 4.0, 3.5, 3.0, 2.5, or ranges including and/or spanning the aforementioned values). In some embodiments, the water is removed from the precipitated proteins.

In some embodiments, the top aqueous layer (comprising water, sugars, and soluble fibers) is removed and the spray dried. In some embodiments, as disclosed elsewhere herein, the residue of the spray drying includes sugars and soluble fibers that can be processed further for consumption.

In some embodiments, the resulting protein powder (or suspension of protein in water) is added to water for additional processing. In some embodiments, the protein in the protein/water mixture has a weight percent of equal to or less than about: 5%, 10%, 15%, 16%, 17%, 20%, 25%, or ranges spanning and/or including the aforementioned values. In some embodiments, to the protein water solution is added hydrogen peroxide (e.g., 34% FOOD GRADE H2O2). In some embodiments, the weight percent of hydrogen peroxide solution relative to the full solution is equal to or less than: 0.01%, 0.05%, 0.07%, 0.08%, 0.1%, or ranges spanning and/or including the aforementioned values. The mixture is agitated for a period of time (e.g., equal to or less than 10 minutes, 15 minutes, 20 minutes, 25 minutes, 40 minutes, 1 hour, 2 hours, or ranges including and/or spanning the aforementioned values).

In some embodiments, during hydrogen peroxide treatment, the mixture is heated (e.g., to a temperature of equal to or at least about: 100° F., 110° F., 120° F., 125° F., 130° F., 135° F., 140° F., 150° F., 160° F., 170° F., 180° F., 190° F., 200° F., 210° F., 212° F., or ranges including and/or spanning the aforementioned values). In some embodiments, after treatment, the solution is pasteurized. In some embodiments, the pasteurization step is performed at elevated temperature (e.g., to a temperature of equal to or at least about: 170° F., 180° F., 190° F., 195° F., 200° F., 210° F., 212° F., or ranges including and/or spanning the aforementioned values).

In some embodiments, the proteins are dried. In some embodiments, the proteins are dried by spray drying, drum drying, or by other drying techniques. In some embodiments, the proteins are dried at elevated temperature.

In some embodiments, a solvent (e.g., hexane) can be used to reduce the fat content of the protein isolate. In some embodiments, with the solvent extraction step, fat can be reduced from equal to or over 30%, 20%, 17%, or 15% to less than or equal to about: 6%, 5.7%, 5%, 4%, 3%, 2.5%, 2%, 1.5%, 1.0%, or ranges including and/or spanning the aforementioned values. In some embodiments, the process for separation removes fiber from the protein product at an efficiency (e.g., percent reduction) of greater than or equal to about: 45%, 60%, 80%, 95%, 98%, 99%, 99.5%, or ranges spanning and/or including the aforementioned values. In some embodiments, the protein is increased to equal to or at least about 85%, 75%, 65%, 60%, (or ranges including and/or spanning the aforementioned values) from less than or equal to about 55%, 45%.

In some embodiments, solvent treatment is not performed. In some embodiments, surprisingly, a stable protein fraction can be isolated along with residual fats from the BSG. In some embodiments, the fat is left in the protein to provide additional beneficial nutritional benefit. In some embodiments, the fat content of the protein isolate is equal to or at least about: 35%, 30%, 25%, 20%, 15%, or ranges including and/or spanning the aforementioned values.

In some embodiments, the protein isolate from the BSG (e.g., that has been treated to remove fats) has a shelf life of equal to or at least about: 6 months, 9 months, 1 year, 2 years, or ranges spanning and/or including the aforementioned values. In some embodiments, the protein isolate from the BSG (e.g., that has been treated to remove fats) has a shelf life relative to the BSG that is improved by equal to or at least about: 10 times, 50 times, or 100 times, 1000 times, or ranges spanning and/or including the aforementioned values. In some embodiments, the dried fat and protein mixture has a shelf life of equal to or at least about: 6 months, 9 months, 1 year, 2 years, or ranges spanning and/or including the aforementioned values. In some embodiments, the dried fat and protein mixture from the BSG has a shelf life relative to the BSG that is improved by equal to or at least about: 10 times, 50 times, or 100 times, 1000 times, or ranges spanning and/or including the aforementioned values.

In some embodiments, surprisingly, using the methods disclosed herein (including methods where a protease is not used), a protein with a PDCAAS score of equal to or at least about: 0.85, 0.90, 0.95, 0.97, 0.98, 0.99, 0.999, 1.0, or ranges including and/or spanning the aforementioned values is provided.

In some embodiments, as disclosed elsewhere herein, hydrogen peroxide can be used to treat the protein. In some embodiments, it has been surprisingly found that treatment of the protein with hydrogen peroxide (and/or other protein isolation methods as disclosed herein) improves the PDCAAS of the BSG protein. This unexpectedly improved property marks improved digestibility (and/or increased nutritional value) for these plant proteins. In some embodiments, using the hydrogen peroxide treatment (and/or other protein isolation methods disclosed herein), a BSG-based protein with a PDCAAS score of equal to or at least about: 0.85, 0.90, 0.95, 0.97, 0.98, 0.99, 0.999, 1.0, or ranges including and/or spanning the aforementioned values is provided. In some embodiments, using hydrogen peroxide treatment, the PDCAAS is increased by equal to or at least about: 15%, 10%, 5%, 2.5%, or ranges including and/or spanning the aforementioned values.

In some embodiments, using hydrogen peroxide treatment (and/or other protein isolation methods disclosed herein), a BSG-based protein with a digestibility score of equal to or at least about: 0.85, 0.90, 0.95, 0.97, 0.98, 0.99, 0.999, 1.0, or ranges including and/or spanning the aforementioned values is provided. In some embodiments, using hydrogen peroxide treatment, the digestibility is increased by equal to or at least about: 15%, 10%, 5%, 2.5%, or ranges including and/or spanning the aforementioned values. This unexpectedly improved property marks improved nutrition from the disclosed protein isolates.

Various embodiments of the protein isolates are characterized by a complete amino acid profile for older children, adolescents, and adults (ages 3 and up, e.g., older child through adult). Some embodiments of the protein isolates are characterized by a complete amino acid profile for children 6 months of age to 3 years of age. Some embodiments of the protein isolates are characterized by a complete amino acid profile for infants from birth to 6 months of age. Some embodiments of the protein isolates are characterized by greater than or equal to 23 milligrams of sulfur-containing amino acids (cysteine+methionine) per gram of protein. Some embodiments of the protein isolates are characterized by an in vitro Protein Digestibility of at least 0.98, and a PDCAAS value of at least 0.98. This includes embodiments of the protein concentrates having an in vitro Protein Digestibility of at least 0.99 and a PDCAAS value of at least 0.99, and further includes embodiments of the protein concentrates having an in vitro Protein Digestibility of 1.0 and a PDCAAS value of 1.0. In some of these embodiments, the protein concentrates are characterized by a complete amino acid profile for children ages 6 months to 3 years and greater than or equal to 27 milligrams of sulfur-containing amino acids (cysteine+methionine) per gram of protein.

In some embodiments, the BSG based protein isolate includes greater than or equal to 6.6 mg tryptophan/g protein, greater than 25 mg threonine/g protein, 30 mg isoleucine/g protein, 61 mg leucine/g protein, 48 mg lysine/g protein, 23 mg methionine+cysteine/g protein, 41 mg phenylalanine+tyrosine/g protein, 40 mg valine/g protein, and/or 16 mg histidine/g protein. In some embodiments, the BSG based protein isolate includes greater than or equal to 8.5 mg tryptophan/g protein, greater than 31 mg threonine/g protein, 32 mg isoleucine/g protein, 66 mg leucine/g protein, 57 mg lysine/g protein, 27 mg methionine+cysteine/g protein, 52 mg phenylalanine+tyrosine/g protein, 43 mg valine/g protein, and/or 20 mg histidine/g protein. In some embodiments, the BSG based protein isolate includes greater than or equal to 17 mg tryptophan/g protein, greater than 44 mg threonine/g protein, 55 mg isoleucine/g protein, 96 mg leucine/g protein, 69 mg lysine/g protein, 33 mg methionine+cysteine/g protein, 94 mg phenylalanine+tyrosine/g protein, 55 mg valine/g protein, and/or 21 mg histidine/g protein.

As disclosed elsewhere herein, PDCAAS is a method of gauging protein quality. PDCAAS was adopted by the U.S. Food and Drug Administration and the Food and Agricultural Organization of the United Nations/World Health Organization in 1993 as the preferred method to determine protein quality. PDCAAS is calculated by multiplying the "Protein Digestibility" for a protein composition by the composition's "Amino Acid Score". The Federal Register, Jan. 6, 1993, Vol. 58, No. 3, P. 2194 provides a standard listing of common protein Digestibility Scores, based on animal studies, and protein concentrate is identified on the Federal Register with a Protein Digestibility of 0.94.

Protein Digestibility can be analyzed via an in vitro analysis technique, as described in U.S. Pat. No. 9,738,920, which is incorporated by reference herein in its entirety. The digestibility score derived from this in vitro technique, which involves enzymatically digesting a protein containing sample to simulate digestion that would occur inside a mammalian body, is referred to herein as in vitro Protein Digestibility. The in vitro Protein Digestibility analysis can be performed commercially by Medallion Labs (General Mills; Minneapolis, Minn.). Medallion Labs provides the in vitro Protein Digestibility as a "ASAP-Quality Score" (Animal-Safe Accurate Protein Quality Score).

The in vitro Protein Digestibility uses enzymatic digestion steps similar to stomach and small intestine for protein digestion. For each cleavage of a protein backbone by an enzyme, an alpha-amino nitrogen (primary amine) is exposed which is reactive to the colorimetric reagent, ninhydrin, and allows for quantification of the digestion reaction. The analysis entails a pepsin digestion at a pH of 2, followed by a trypsin/chymotrypsin digestion at a pH of 7.5, followed by a TCA precipitation and centrifugation, followed by the reaction of the resulting supernatant with ninhydrin. Quantification is done by absorbance spectroscopy.

Figure 2:
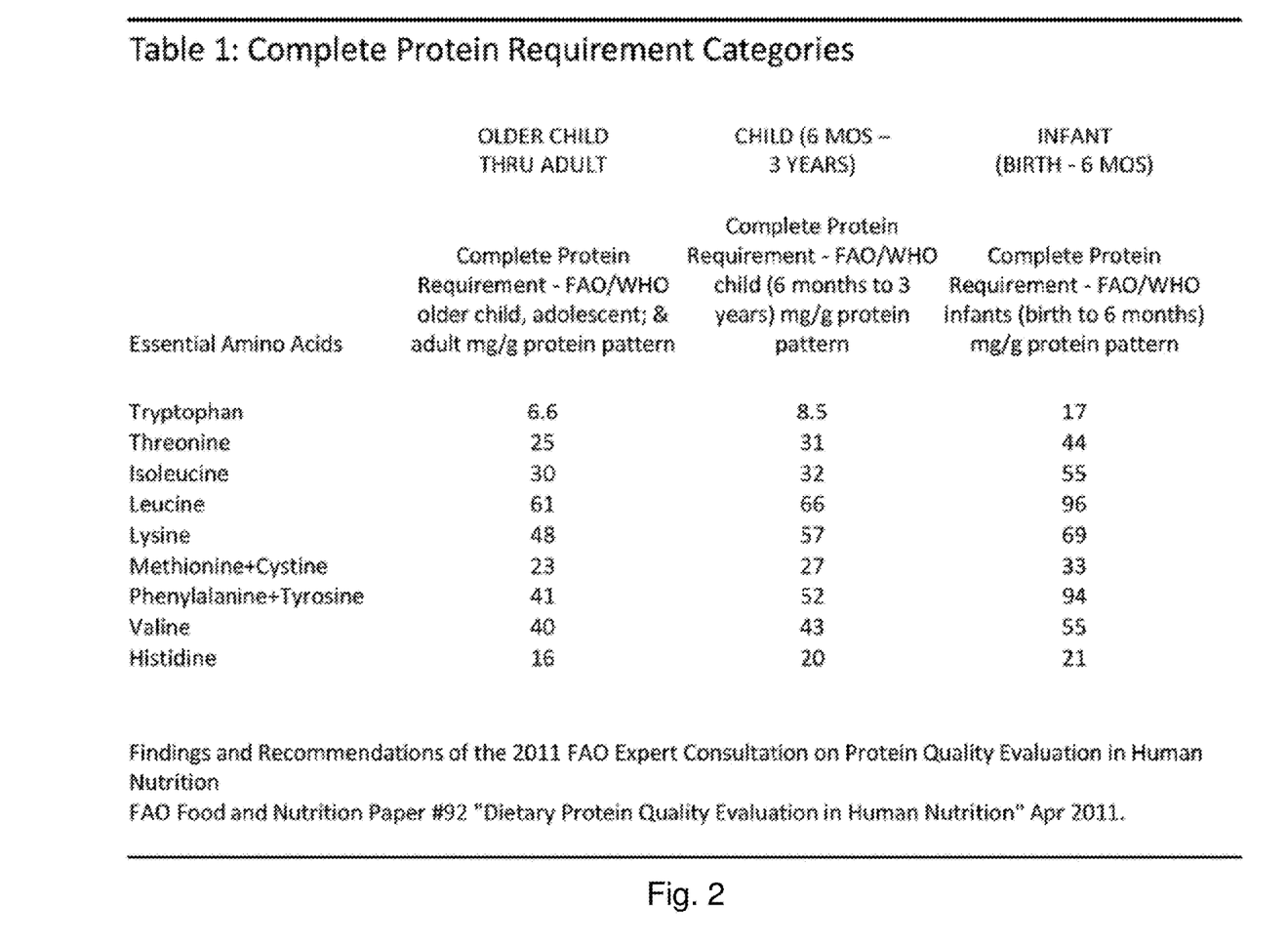
FIG. 2 is a table for of complete protein requirement categories for calculating Protein Digestibility Corrected Amino Acid Score (PDCAAS).

The other component to PDCAAS calculation is Amino Acid Score. The Amino Acid Score compares a protein's eleven Essential Amino Acids: Histidine, Isoleucine, Leucine, Lysine, Methionine+Cysteine (the sulfur-containing amino acids), Phenylalanine+Tyrosine (aromatic amino acids), Threonine, Tryptophan, and Valine, with the recommended essential amino acid protein profiles of The Food and Agricultural Organization of the United Nations/World Health Organization (1985), which vary depending on factors like age, weight, gender, and other criteria. In 2011, FAO published Food and Nutrition Paper #92 "Dietary Protein Quality Evaluation in Human Nutrition" recommended consolidation of the amino acid pattern to three categories: Infant (birth to 6 months), Young Children (6 months to 3 years), and Older Children, Adolescents, and Adults. Table 1 in FIG. 2 provides the 2011 FAO/WHO recommended amino acid scoring patterns for each of these three classifications. For the purposes of this disclosure, complete amino acid profiles for a given age group refer to the complete amino acid profiles published in the FAO published Food and Nutrition Paper #92, as published in 2011 and listed in Table 1 of FIG. 2.

The Amino Acid Score compares the above-referenced amino acid pattern which is appropriate for the age of the individual in order to determine any limiting amino acid(s). The lowest concentration of limiting amino acid divided by the pattern for that amino acid equals the Amino Acid Score. For example, for most protein concentrates that are currently available, an upper limit is placed on the Amino Acid Score due to insufficient Sulfur-containing Amino Acids (Methionine+Cysteine). If the complete protein requirement for older children through adults is set at 23 mg/g, and a protein concentrate only has 16 mg/g sulfur-containing amino acids then the formula to calcuate the Amino Acid Score would be 16 mg/23 mg=0.71.

Amino acid contents and Amino Acid Scores for the protein concentrates are analyzed using Official Method 988.12 (for amino acids, other than tryptophan) or 988.15 (for tryptophan), as published Official Methods of Analysis of AOAC International, 20th Edition (2016), Gaithersburg, Md. The final formula to determine PDCAAS for a protein concentrate multiplies the Amino Acid Score times the Protein Digestibility. Thus, the PDCAAS for a protein concentrate having an Amino Acid Score of 0.71 and a Protein Digestibility of 0.94 (obtained from the previously identified Federal Register reference) would be calculated as follows: Amino Acid Score 0.71×Protein Digestibility 0.94=0.66 PDCAAS. Commercial plant-based protein concentrates typically are deficient in sulfur-containing amino acids (Cysteine+Methionine) and/or tryptophan with Amino Acid Scores ranging from 0.65 to 0.73 for children aged 6 months to 3 years.

In some embodiments, using the methods disclosed herein, a protein isolate with an Amino Acid Score of equal to or at least about: 0.85, 0.90, 0.95, 0.97, 0.98, 0.99, 0.999, 1.0, or ranges including and/or spanning the aforementioned values is provided. In some embodiments, using hydrogen peroxide treatment, the Amino Acid Score is increased by equal to or at least about: 15%, 10%, 5%, 2.5%, or ranges including and/or spanning the aforementioned values. This unexpectedly improved property marks improved digestibility.

As used herein, the terms "site of generation" or "generation site" refer to the site where the device for the generation of BSG is located. In one embodiment exemplified herein, the generation site includes a brewery.

In some embodiments, the methods and equipment disclosed herein are suitable for use in close proximity to the generation point of the BSG. In some embodiments, the methods can be performed proximal to the site where the BSG is produced. Advantageously, this can reduce the opportunity for BSG rot. The terms "close proximity" and "proximal" are used to refer to the relative locations of the generation site and the use site when the two sites are within a distance that allows for the BSG to travel the distance within a half-life of its decomposition. "Half-life" of a decomposition is understood to be the amount of time it takes for one half of the material present to undergo decomposition to the point where it is unusable and/or unprocessable as a food product. The half-life for any given composition will depend on the conditions under which the BSG is generated and/or stored. Thus, for example, the temperature, concentration, and presence of impurities or bacteria will all tend to affect the half-life of a BSG composition. The distance between the generation site and the protein extraction site may be defined in terms of the half-life and a length of time required for delivery, rather than simply in terms of physical displacement. Thus, the physical displacement between a generation site and protein extraction site that are in close proximity may vary depending on the half-life of the composition being delivered between the two sites and the rate at which the composition is delivered. Accordingly factors affecting both the rate of composition transfer and factors affecting the half-life will all affect the maximum physical displacement permissible for the two sites to remain in close proximity.

The on-site generation methods provide a number of advantages over known processes. Initially, because the produced BSG can be used without further substantial purification or stabilization, there is no need for storage or shipping. In addition, eliminating the need for a shipping BSG ultimately saves costs by increasing the yield.

Protein Isolate Compositions

In some embodiments, as disclosed elsewhere herein, a protein isolate is provided. In some embodiments, advantageously, the protein isolate is a vegetarian or vegan protein isolate. In some embodiments, a BSG-based protein isolate is provided. In some embodiments, at least a portion of the protein isolates provided herein is provided from a BSG-based protein isolate. In some embodiments, mixtures of various plant proteins (e.g., from white rice, brown rice, rice bran, flaxseed, coconut, pumpkin, hemp, pea, chia, lentil, fava, potato, sunflower, quinoa, amaranth, oat, wheat, etc.) can be mixed with one or more BSG-based proteins as disclosed herein to provide a protein isolate. In some embodiments, the protein isolate is derived solely from BSG (and/or lacks plant proteins that were not subjected to brewing processes). In some embodiments, as disclosed elsewhere herein, the protein isolate may be isolated from organic plant sources and or organically certifiable plant sources. In some embodiments, the BSG-based protein isolate has improved properties, including one or more of improved digestibility, improved PDCAAS, and/or a beneficial amino acid profile. In some embodiments, the source of protein within the nutritional supplement consists only of BSG-based protein isolate.

In some embodiments, the protein isolate (e.g., BSG-based protein isolate) comprises the branched chain amino acids (BCAAs) leucine, isoleucine, and valine.

In some embodiments, the amount of leucine (in mg) per gram of protein in the protein isolate (e.g., BSG-based protein isolate) is less than or equal to about: 115, 110, 100, 96, 95, 90, 85, 80, 75, 70, 66, 61, 60, 50, 40, 30, 20, 10, or ranges including and/or spanning the aforementioned values. For example, each gram of protein in the protein isolate may comprise between about 80 mg and about 90 mg, about 75 mg and about 85 mg, about 90 mg and about 95 mg, about 95 mg and about 110 mg, or about 100 mg and about 115 mg of leucine.

In some embodiments, the amount of isoleucine (in mg) per gram of protein in the protein isolate (e.g., BSG-based protein isolate) is less than or equal to about: 70, 60, 55, 50, 45, 40, 35, 32, 30, 20, 10, or ranges including and/or spanning the aforementioned values. For example, each gram of protein in the protein isolate may comprise between about 10 mg and about 30 mg, about 20 mg and about 30 mg, about 45 mg and about 35 mg, about 30 mg and about 50 mg, about 40 mg and about 50 mg, about 50 mg and about 60 mg, or about 60 mg and about 70 mg of isoleucine.

In some embodiments, the amount of valine (in mg) per gram of protein in the protein isolate (e.g., BSG-based protein isolate) is less than or equal to about: 70, 65, 60, 55, 50, 43, 40, 30, 20, 10, or ranges including and/or spanning the aforementioned values. For example, each gram of protein in the protein isolate may comprise between about 0 mg and about 10 mg, about 10 mg and about 30 mg, about 20 mg and about 40 mg, about 10 mg and about 60 mg, about 30 mg and about 40 mg, about 30 mg and about 50 mg, about 55 mg and about 65 mg, about 50 mg and about 70 mg, or about 60 mg and about 70 mg of valine.

In some embodiments, the protein isolate (e.g., BSG-based protein isolate) comprises the sulfur-containing amino acids cysteine and methionine.

In some embodiments, the amount of cysteine (in mg) per gram of protein in the protein isolate (e.g., BSG-based protein isolate) is less than or equal to about: 40, 35, 30, 25, 20, 15, 10, 5, or ranges including and/or spanning the aforementioned values. For example, each gram of protein in the protein isolate may comprise between about 0 mg and about 5 mg, about 5 mg and about 10 mg, about 10 mg and about 20 mg, or about 25 mg and about 35 mg of cysteine.

In some embodiments, the amount of methionine (in mg) per gram of protein in the protein isolate (e.g., BSG-based protein isolate) is less than or equal to about: 40, 35, 30, 25, 20, 10, or ranges including and/or spanning the aforementioned values. For example, each gram of protein in the protein isolate may comprise between about 0 mg and about 10 mg, about 10 mg and about 30 mg, about 25 mg and about 35 mg, or about 25 mg and about 40 mg of methionine.

In some embodiments, the BSG-based protein isolate comprises the aromatic amino acids phenylalanine and tyrosine.

In some embodiments, the amount of phenylalanine (in mg) per gram of protein in the protein isolate (e.g., BSG-based protein isolate) is less than or equal to about: 80, 70, 60, 55, 50, 45, 40, 35, 30, 20, 10, or ranges including and/or spanning the aforementioned values. For example, each gram of protein in the protein isolate may comprise between about 0 mg and about 10 mg, about 10 mg and about 20 mg, about 20 mg and about 30 mg, about 30 mg and about 40 mg, about 40 mg and about 50 mg, about 50 mg and about 60 mg, or about 60 mg and about 70 mg of phenylalanine.

In some embodiments, the amount of tyrosine (in mg) per gram of protein in the protein isolate (e.g., BSG-based protein isolate) is less than or equal to about: 80, 70, 60, 50, 45, 40, 35, 30, 20, 10, 5, or ranges including and/or spanning the aforementioned values. For example, each gram of protein in the protein isolate may comprise between about 0 mg and about 5 mg, about 5 mg and about 20 mg, about 20 and about 50 mg, about 20 mg and about 35 mg, about 35 mg and about 45 mg, about 45 mg and about 50 mg, or about 45 mg and about 60 mg of tyrosine.

In some embodiments, the BSG-based protein isolate comprises lysine, threonine, tryptophan, histidine, arginine, serine, alanine, proline, glycine, glutamic acid, and aspartic acid.

In some embodiments, the amount of lysine (in mg) per gram of protein in the protein isolate (e.g., BSG-based protein isolate) is less than or equal to about: 110, 100, 90, 80, 70, 69, 60, 57, 55, 50, 48, 45, 40, 35, 30, 25, 20, 10, or ranges including and/or spanning the aforementioned values. For example, each gram of protein in the protein isolate may comprise between about 0 mg and about 30 mg, about 20 mg and about 30 mg, about 20 mg and about 35 mg, about 35 mg and about 45 mg, about 45 mg and about 55 mg, about 55 mg and about 70 mg, or about 10 mg and about 50 mg of lysine.

In some embodiments, the amount of threonine (in mg) per gram of protein in the protein isolate (e.g., BSG-based protein isolate) is less than or equal to about: 80, 70, 60, 50, 45, 44, 40, 35, 31, 30, 25, 20, 10, or ranges including and/or spanning the aforementioned values. For example, each gram of protein in the protein isolate may comprise between about 0 mg and about 10 mg, about 10 mg and about 20 mg, about 20 mg and about 30 mg, about 30 mg and about 40 mg, about 40 mg and about 50 mg, about 50 mg and about 60 mg, about 60 mg and about 70 mg, or about 70 mg and about 80 mg of threonine.

In some embodiments, the amount of tryptophan (in mg) per gram of protein in the protein isolate (e.g., BSG-based protein isolate) is less than or equal to about: 60, 50, 40, 30, 20, 17, 10, 8, 6, 5, or ranges including and/or spanning the aforementioned values. For example, each gram of protein in the protein isolate may comprise between about 0 mg and about 10 mg, about 10 mg and about 20 mg, about 10 mg and about 30 mg of tryptophan.

In some embodiments, the amount of histidine (in mg) per gram of protein in the protein isolate (e.g., BSG-based protein isolate) is less than or equal to about: 40, 30, 25, 21, 20, 16, 15, 10, 5, or ranges including and/or spanning the aforementioned values. For example, each gram of protein in the protein isolate may comprise between about 0 mg and about 5 mg, about 5 mg and about 15 mg, about 15 mg and about 25 mg, or about 25 mg and about 40 mg of histidine.

In some embodiments, the amount of arginine (in mg) per gram of protein in the protein isolate (e.g., BSG-based protein isolate) is less than or equal to about: 90, 85, 80, 75, 70, 65, 60, 50, 40, 30, 20, 10, or ranges including and/or spanning the aforementioned values. For example, each gram of protein in the protein isolate may comprise between about 0 mg and about 10 mg, about 10 mg and about 20 mg, about 20 mg and about 30 mg, about 30 mg and about 40 mg, about 40 mg and about 50 mg, about 50 mg and about 60 mg, about 60 mg and about 70 mg, about 70 mg and about 80 mg, or about 80 mg and about 90 mg of arginine.

In some embodiments, the amount of serine (in mg) per gram of protein in the protein isolate (e.g., BSG-based protein isolate) is less than or equal to about: 80, 70, 60, 55, 50, 45, 40, 30, 20, 10, or ranges including and/or spanning the aforementioned values. For example, each gram of protein in the protein isolate may comprise between about 0 mg and about 10 mg, about 10 mg and about 30 mg, about 10 mg and about 40 mg, about 30 mg and about 50 mg, about 40 mg and about 55 mg, about 45 and about 55 mg, about 50 mg and about 65 mg of serine.

In some embodiments, the amount of alanine (in mg) per gram of protein in the protein isolate (e.g., BSG-based protein isolate) is less than or equal to about: 65, 60, 55, 50, 45, 40, 30, 20, 10, or ranges including and/or spanning the aforementioned values. For example, each gram of protein in the protein isolate may comprise between about 0 mg and about 10 mg, about 10 mg and about 20 mg, about 20 mg and about 30 mg, about 30 mg and about 40 mg, about 40 mg and about 50 mg, or about 50 mg and about 60 mg of alanine.

In some embodiments, the amount of proline (in mg) per gram of protein in the protein isolate (e.g., BSG-based protein isolate) is less than or equal to about: 80, 70, 60, 55, 50, 45, 40, 35, 30, 20, 10, or ranges including and/or spanning the aforementioned values. For example, each gram of protein in the protein isolate may comprise between about 0 mg and about 10 mg, about 10 mg and about 20 mg, about 20 mg and about 30 mg, about 30 mg and about 40 mg, about 40 mg and about 50 mg, about 50 mg and about 60 mg, or about 60 mg and about 70 mg of proline.

In some embodiments, the amount of glycine (in mg) per gram of protein in the protein isolate (e.g., BSG-based protein isolate) is less than or equal to about: 80, 70, 60, 55, 50, 45, 40, 30, 20, 10, or ranges including and/or spanning the aforementioned values. For example, each gram of protein in the protein isolate may comprise between about 0 mg and about 10 mg, about 10 mg and about 20 mg, about 20 mg and about 30 mg, about 30 mg and about 40 mg, about 40 mg and about 50 mg, or about 50 mg and about 60 mg of glycine.

In some embodiments, the amount of glutamic acid (in mg) per gram of protein in the protein isolate (e.g., BSG-based protein isolate) is less than or equal to about: 200, 190, 180, 175, 170, 165, 160, 150, 140, 130, 120, 110, 100, 90, 80, 70, 60, 50, 40, 30, 20, 10, or ranges including and/or spanning the aforementioned values. For example, each gram of protein in the protein isolate may comprise between about 0 mg and about 10 mg, about 10 mg and about 20 mg, about 20 mg and about 30 mg, about 30 mg and about 40 mg, about 40 mg and about 50 mg, about 50 mg and about 60 mg, about 60 mg and about 70 mg, about 70 mg and about 80 mg, about 80 mg and about 90 mg, about 90 mg and about 100 mg, about 100 mg and about 110 mg, about 110 mg and about 120 mg, about 120 mg and about 130 mg, about 130 mg and about 140 mg, about 140 mg and about 150 mg, about 150 mg and about 160 mg, about 160 mg and about 170 mg, about 170 mg and about 180 mg, about 180 mg and about 190 mg, or about 190 mg and about 200 mg of glutamic acid.

In some embodiments, the amount of aspartic acid (in mg) per gram of protein in the protein isolate (e.g., BSG-based protein isolate) is less than or equal to about: 120, 110, 100, 95, 90, 85, 80, 75, 70, 60, 50, 40, 30, 20, 10, or ranges including and/or spanning the aforementioned values. For example, each gram of protein in the protein isolate may comprise between about 0 mg and about 10 mg, about 10 mg and about 20 mg, about 20 mg and about 30 mg, about 30 mg and about 40 mg, about 40 mg and about 50 mg, about 50 mg and about 60 mg, about 60 mg and about 70 mg, about 70 mg and about 80 mg, about 80 mg and about 90 mg, about 90 mg and about 100 mg, about 100 mg and about 110 mg, or about 110 mg and about 120 mg of aspartic acid.

In some embodiments, each gram of protein in the protein isolate comprises between about 50 mg and about 60 mg alanine, between about 70 mg and 80 mg arginine, between about 80 mg and about 90 mg aspartic acid, between about 15 mg and about 25 mg cysteine, between about 170 mg and 180 mg of glutamic acid, about 40 mg and about 50 mg glycine, between about 15 mg and about 25 mg histidine, between about 35 mg about 45 mg isoleucine, between about 75 mg and about 95 mg of leucine, between about 25 mg and about 55 mg lysine, between about 25 mg and about 35 mg of methionine, between about 50 mg and about 60 mg phenylalanine, between about 40 mg and about 50 mg proline, between about 45 mg and about 55 mg serine, between about 30 mg and about 40 mg threonine, between about 10 mg and about 20 mg tryptophan, between about 45 mg and about 55 mg tyrosine, and between about 55 mg and about 65 mg of valine.

In some embodiments, each gram of protein in the protein isolate comprises between about 30 mg and about 50 mg alanine. In some embodiments, each gram of protein in the protein isolate comprises between about 40 mg and 65 mg arginine. In some embodiments, each gram of protein in the protein isolate comprises between about 60 mg and about 85 mg aspartic acid. In some embodiments, each gram of protein in the protein isolate comprises between about 10 mg and about 25 mg cysteine. In some embodiments, each gram of protein in the protein isolate comprises between about 115 mg and 160 mg of glutamic acid. In some embodiments, each gram of protein in the protein isolate comprises about 15 mg and about 35 mg glycine. In some embodiments, each gram of protein in the protein isolate comprises between about 10 mg and about 25 mg histidine. In some embodiments, each gram of protein in the protein isolate comprises between about 35 mg and about 55 mg isoleucine. In some embodiments, each gram of protein in the protein isolate comprises between about 60 mg and about 85 mg of leucine. In some embodiments, each gram of protein in the protein isolate comprises between about 30 mg and about 50 mg lysine. In some embodiments, each gram of protein in the protein isolate comprises between about 10 mg and about 25 mg of methionine. In some embodiments, each gram of protein in the protein isolate comprises between about 25 mg and about 45 mg phenylalanine. In some embodiments, each gram of protein in the protein isolate comprises between about 40 mg and about 60 mg proline. In some embodiments, each gram of protein in the protein isolate comprises between about 30 mg and about 50 mg serine. In some embodiments, each gram of protein in the protein isolate comprises between about 30 mg and about 50 mg threonine. In some embodiments, each gram of protein in the protein isolate comprises between about 5 mg and about 20 mg tryptophan. In some embodiments, each gram of protein in the protein isolate comprises between about 20 mg and about 40 mg tyrosine. In some embodiments, each gram of protein in the protein isolate comprises between about 35 mg and about 60 mg of valine.

In some embodiments, each gram of protein in the protein isolate comprises between about 30 mg and about 50 mg alanine, between about 40 mg and 65 mg arginine, between about 60 mg and about 85 mg aspartic acid, between about 10 mg and about 25 mg cysteine, between about 115 mg and 160 mg of glutamic acid, about 15 mg and about 35 mg glycine, between about 10 mg and about 25 mg histidine, between about 35 mg about 55 mg isoleucine, between about 60 mg and about 85 mg of leucine, between about 30 mg and about 50 mg lysine, between about 10 mg and about 25 mg of methionine, between about 25 mg and about 45 mg phenylalanine, between about 40 mg and about 60 mg proline, between about 30 mg and about 50 mg serine, between about 30 mg and about 50 mg threonine, between about 5 mg and about 20 mg tryptophan, between about 20 mg and about 40 mg tyrosine, and between about 35 mg and about 60 mg of valine.

In some embodiments, the protein isolates disclosed herein (e.g., protein isolates derived from BSG comprising one or more of barley, wheat, rice, flaxseed, coconut, pumpkin, hemp, pea, chia, lentil, fava, potato, sunflower, quinoa, amaranth, oat, sorghum, millet, teff, or combinations thereof) have a complete essential amino acid profile for one or more age groups, as provided in FIG. 2, wherein the essential amino acids comprise the following 9 groups: 1) Histidine, 2) Isoleucine, 3) Leucine, 4) Lysine, 5) Methionine+Cysteine, 6) Phenylalanine+Tyrosine, 7) Threonine, 8) Tryptophan, and 9) Valine. In some embodiments, the protein isolates disclosed herein provide complete essential amino acid profiles for equal to or at least 8 of the 9 essential amino acid groups. In some embodiments, the protein isolates disclosed herein provide complete essential amino acid profiles for equal to or at least 7 of the 9 essential amino acid groups. In some embodiments, the protein isolates disclosed herein provide complete essential amino acid profiles for equal to or at least 6 of the 9 essential amino acid groups.

Because of potential health risks and/or potential dangers associated with consuming chemically treated food, there is a growing demand for organic food. In the United States, there are currently four different levels or categories for organic labeling: 1) '100%' Organic (all ingredients are produced organically); 2) 'Organic' (at least 95% or more of the ingredients are organic); 3) 'Made With Organic Ingredients' (contains at least 70% organic ingredients); and 4) 'Less Than 70% Organic Ingredients' (where three of the organic ingredients must be listed under the ingredient section of the label). Foods that are organically prepared must be free of artificial food additives, and are often processed with fewer artificial methods, materials and conditions, such as chemical ripening, food irradiation, and genetically modified ingredients. Non-synthetic pesticides (e.g., naturally occurring) or treatments are allowed but synthetic ones generally are not. In some embodiments, the protein isolates disclosed herein are organic (e.g., organic-certified or certifiable under any U.S. organic certification standard, European organic certification standard, or Japanese organic certification standards).

In some embodiments, the protein product is advantageously suspendable product. In some embodiments, the protein product (e.g., protein isolate) remains suspended in water for long. In some embodiments, upon mixing about 20 g of the protein isolate in 12 fluid ounces of water, the product remains in suspension without visible and/or measurable sedimentation for a period of equal to or at least about: 15 minutes, 30 minutes, 60 minutes, 120 minutes, or ranges including and/or spanning the aforementioned values. In some embodiments, upon mixing about 20 g of the protein isolate in 12 fluid ounces of water, the product remains in suspension without visible and/or measurable sedimentation for a period of equal to or at least about: a week, a month, two months, six months, or ranges including and/or spanning the aforementioned values.

In some embodiments, the protein isolates and/or sugar fractions disclosed herein can be mixed with food-grade ingredients, including but not limited to, those that are Generally Recognized as Safe (GRAS) by the U.S. Food and Drug Administration to provide a solid (e.g., powder) or liquid supplement that can easily be mixed with or used as foodstuffs and beverages. For example, the concentrates can be mixed with coloring agents (e.g., natural dyes), flavoring agents (e.g., sugar and other natural sweeteners, natural vanilla flavoring, etc.), plant-based oils (e.g., canola oil, safflower oil, grapeseed oil, etc.), vitamins, minerals, preservatives, emulsifying agents, thickeners, and the like. The isolates, alone or in combination with one of more of these additional ingredients, can then be included in a foodstuff (e.g., a protein powder, protein bar, cooking flour, baked good, etc.) or beverage by methods known in the field of food and beverage processing, such as simple mixing. The amount of the isolate in a food product will depend on the beverage of foodstuff to which they are added. By way of illustration only, some food products will include protein isolate in an amount of equal to or at least about: 1 wt. %, 10 wt %, 20 wt %, 30 wt %, 50 wt. %, 75 wt %, 99 wt. %, or ranges spanning and/or including the aforementioned values. This includes, for example, food products that contain about 1 to about 50 wt. % protein isolate, 10 wt % to about 30 wt. % protein isolate, etc.

Specific examples of food products can include the protein isolates include non-dairy based drinks, non-dairy yogurts, and non-dairy nutritional beverage powders. Liquid-based nutritional or dietary supplement compositions for oral administration can be prepared in water, juices, or other aqueous vehicles. Useful liquid forms include solutions, suspensions, emulsions, and the like.

The nutritional and dietary supplement compositions may or may not be presented in unit dosage forms and/or servings, depending on the delivery system and/or the end user. Unit dosage, for example, would be applicable to a ready to drink (RTD) delivery system. The unit dosage form can be a packaged preparation, the package containing discrete quantities of preparation. Food bars and biscuits are likewise amenable to unit dosage servings. Cereals and pastas may be provided in unit dosage forms or a multi-serving bulk box for home use. A serving can be in the form of a multiplicity of baked cereal pieces, crisps, or puffs, or in the form of a variety of pastas. The serving form can be a packaged preparation, the package containing discrete pieces, such as packaged cereal pieces, crisps, or puffs, or it can be the appropriate number of any of these in packaged form. One useful serving can be dry volume measures as used in baking, such as, for example, ½ cup or 1 cup.

The edible components may be combined with one or more solid inactive ingredients or excipients for the preparation of cereal pieces, chips, flakes, clusters, puffs, spheres, ribbons, biscuits, bars, gum pieces, tablets, capsules, pills, powders, granules or other suitable edible dosage forms. Various forms or shapes can be accommodated in the baked or extruded edible embodiments. Forms may be selected from the group consisting of a cereal piece, chip, flake, cluster, puff, sphere, ribbon, biscuit, chex-like shape, and O-shape. Such shapes can be formed during a manufacturing process, such as, for example, extrusion followed by automated knife-cutting.

Methods of Use

Some embodiments provide methods of supplementing a diet and/or improving the results of exercise training by providing a subject with any one of a nutritional supplement comprising a protein isolate as disclosed herein. In some embodiments, the protein isolate comprises only BSG-based protein (e.g., protein isolated solely from BSG). In some embodiments, the nutritional supplement comprising BSG protein isolate as described herein provides nutrition for sustained improvements in exercise training outcomes and nutritional supplementation outcomes.

In some embodiments, exercise training with ingestion of the nutritional supplements described herein before, during, or after exercise training results in one or more of increased muscle mass, increased strength, increased power, increased endurance, increased VO2 max, increased cardiovascular endurance, increased respiratory endurance, increased stamina, increased lean body mass, improved body composition, or decreased fat. Some embodiments provide the supplementation of a diet of a subject, comprising providing the nutritional supplements described herein to a subject, wherein the subject is a newborn, infant, toddler, child, adolescent, adult, or a geriatric individual, wherein ingestion of an effective amount of the nutritional supplement by the subject results in one or more of weight gain, weight maintenance, growth, muscle growth, muscle maintenance, decreased muscle loss, improved recovery after exercise training, faster recovery after exercise training, decreased muscle soreness associated with exercise training, or maintaining nitrogen balance. In some embodiments, by supplementing the diet of a subject, improvements in results of exercise training can be achieved along with improvements in the ability to perform day-to-day activities (e.g. climbing stairs, getting out of a chair, walking).

In some embodiments, the method of improving a result of exercise training in a subject comprises providing a nutritional supplement as disclosed herein to the subject, wherein ingestion of an effective amount of the nutritional supplement by the subject before, during, and/or after exercise training results in one or more of increased muscle mass, increased strength, increased power, increased endurance, increased VO2 max, increased cardiovascular endurance, increased respiratory endurance, increased stamina, increased lean body mass, improved body composition, or decreased fat.

In some embodiments, the improved result of exercise training is increased skeletal muscle hypertrophy. In some embodiments of the method, the improved result of exercise training is an increase in strength. In some embodiments of the method, the improved result of exercise training is an increase in power. In some embodiments of the method, the improved result of exercise training is improved body composition. In some embodiments of the method, the improved result of exercise training is an increase VO2 max. In some embodiments of the method, the improved result of exercise training is an increase in exercise duration and/or exercise performance.

In some embodiments, supplementation using the protein isolates described herein results in muscle mass, strength, power, endurance, VO2 max, cardiovascular endurance, respiratory endurance, stamina, lean body mass, body composition, and/or fat composition changes in a subject that are comparable to (e.g., not statistically different from supplementation with whey protein). In some embodiments, the administration of the nutritional supplement before, during, and/or after exercise training results in quicker recovery and/or less perceived soreness after exercise training in a subject that is comparable to and/or has a statistically insignificant difference to supplementation using whey protein (wherein the BSG-based protein isolate and whey protein isolate are isonitrogenous, isocaloric, and/or macronutrient ratio matched with one another).

In some embodiments, the method of providing a nutritional supplement comprising a protein isolate to a subject before, during, and/or after exercise training results in a muscle mass increase ranging from about 0.5% to about 1.5%, about 1.5% to about 2.5%, about 2.5% to about 5.0%, or greater than 5.0% after a four week period of using the supplement. In some embodiments, the method of providing a nutritional supplement comprising a protein isolate to a subject before, during, and/or after exercise training results in a muscle mass increase ranging from about 0.5% to about 1.5%, about 1.5% to about 2.5%, about 2.5% to about 5.0%, about 5.0% to about 7.5%, about 7.5% to about 10.0%, or greater than 10.0% after an eight week period of using the supplement.

In some embodiments, the method of providing a nutritional supplement comprising a protein isolate to a subject before, during, and/or after exercise training results in an increase in strength (as measured by the improvement in amount of weight lifted performing a one rep maximum lift) ranging from about 0.5% to about 2.5%, about 2.5% to about 5.0%, about 5.0% to about 10.0%, 10.0% to about 20%, or greater than 20.0% after a four week period of using the supplement. In some embodiments, the method of providing a nutritional supplement comprising a protein isolate to a subject before, during, and/or after exercise training results in an increase in strength ranging from about 0.5% to about 2.5%, about 2.5% to about 5.0%, about 5.0% to about 10.0%, about 10.0% to about 20.0%, about 20.0% to about 30.0%, or greater than 30.0% after an eight week period of using the supplement.

In some embodiments, the method of providing a nutritional supplement comprising a protein isolate to a subject before, during, and/or after exercise training results in an increase in power (as measured by during a maximal cycling ergometry test, as described below) ranging from about 0.5% to about 2.5%, about 2.5% to about 5.0%, about 5.0% to about 10.0%, 10.0% to about 20%, or greater than 20.0% after a four week period of using the supplement. In some embodiments, the method of providing a nutritional supplement comprising a protein isolate to a subject before, during, and/or after exercise training results in an increase in strength ranging from about 0.5% to about 2.5%, about 2.5% to about 5.0%, about 5.0% to about 10.0%, about 10.0% to about 20.0%, about 20.0% to about 30.0%, or greater than 30.0% after an eight week period of using the supplement.

In some embodiments, the method of providing a nutritional supplement comprising a protein isolate to a subject before, during, and/or after exercise training results in a VO2 max increase ranging from about 0.5% to about 1.5%, about 1.5% to about 2.5%, about 2.5% to about 5.0%, or greater than 5.0% after a four week period of using the supplement. In some embodiments, the method of providing a nutritional supplement comprising a protein isolate to a subject before, during, and/or after exercise training results in a VO2 max increase ranging from about 0.5% to about 1.5%, about 1.5% to about 2.5%, about 2.5% to about 5.0%, about 5.0% to about 7.5%, about 7.5% to about 10.0%, or greater than 10.0% after an eight week period of using the supplement.

In some embodiments, the method of providing a nutritional supplement comprising a protein isolate to a subject before, during, and/or after exercise training results in a lean body mass increase ranging from about 0.5% to about 1.5%, about 1.5% to about 2.5%, about 2.5% to about 5.0%, or greater than 5.0% after a four week period of using the supplement. In some embodiments, the method of providing a nutritional supplement comprising a protein isolate to a subject before, during, and/or after exercise training results in a muscle mass increase ranging from about 0.5% to about 1.5%, about 1.5% to about 2.5%, about 2.5% to about 5.0%, about 5.0% to about 7.5%, about 7.5% to about 10.0%, or greater than 10.0% after an eight week period of using the supplement.

In some embodiments, the method of providing a nutritional supplement comprising a protein isolate to a subject before, during, and/or after exercise training results in a body fat decrease ranging from about 0.5% to about 1.5%, about 1.5% to about 2.5%, about 2.5% to about 5.0%, or greater than 5.0% after a four week period of using the supplement. In some embodiments, the method of providing a nutritional supplement comprising a protein isolate to a subject before, during, and/or after exercise training results in a body fat decrease ranging from about 0.5% to about 1.5%, about 1.5% to about 2.5%, about 2.5% to about 5.0%, about 5.0% to about 7.5%, about 7.5% to about 10.0%, or greater than 10.0% after an eight week period of using the supplement.

Some embodiments pertain to methods of supplementing the diet of a subject. In some embodiments, the diet supplementation involves providing nutritional supplementation for weight gain, weight maintenance, decreased weight loss, growth, muscle growth, muscle maintenance, and/or decreased muscle loss in newborn or infant subjects. In some instances, newborns and/or infants may have reactions (e.g. allergic reactions) to breast milk, whey, or soy based proteins. In such instances, BSG-based protein may be provided as an alternative protein source. In some embodiments, the method of providing nutritional supplementation to a newborn or infant subject comprises providing a nutritional supplement comprising a protein isolate to the subject, wherein ingestion of an effective amount of the nutritional supplement by the subject between meals, as a meal replacement, or combinations thereof results in one or more of weight gain, weight maintenance, body growth, muscle growth, maintenance of muscle mass, or fat gain.

Some embodiments pertain to methods of providing nutritional supplementation for one or more of weight gain, weight maintenance, decreased weight loss, growth, muscle growth, muscle maintenance, or decreased muscle loss in one or more of a newborn, infant, toddler, child, adolescent, adult, or geriatric subject. In some embodiments, the method of providing nutritional supplementation to one or more of a newborn, infant, toddler, child, adolescent, adult, or geriatric subject comprises providing a nutritional supplement comprising a protein isolate to the subject, wherein ingestion of an effective amount of the nutritional supplement by the subject between meals, as a meal replacement, or combinations thereof results in one or more of weight gain, weight maintenance, growth, muscle growth, muscle maintenance, decreased muscle loss, improved recovery after exercise training, decreased recovery time associated with exercise training, decreased muscle soreness associated with exercise training, or maintained nitrogen balance. Nitrogen balance maintenance can be a measure of muscle amounts in the body.

Some embodiments provide methods of supplementing the diet of a subject, comprising providing any of the nutritional supplements described above to a subject, wherein the subject is a newborn, infant, toddler, child, adolescent, adult, or a geriatric individual, wherein ingestion of an effective amount of the nutritional supplement by the subject results in at least one of weight gain, weight maintenance, growth, muscle growth, muscle maintenance, decreased muscle loss, improved recovery after exercise training, decreased recovery time associated with exercise training, decreased muscle soreness associated with exercise training, or nitrogen balance maintenance.

In some embodiments of the methods described above, servings of the nutritional supplement comprising protein isolate are provided to the subject for ingestion once, twice, three times, four times, or five times, or more than five times daily. In some embodiments, the method the nutritional supplement is provided for ingestion on nonconsectutive days (e.g one time per week, two times per week, three times per week, four times per week, five times per week, or six times per week) or by a schedule determined by a physician.

In some embodiments, the effective amount of nutritional supplement is a serving of dry nutritional supplement weighing between about 1 g and about 10 g, about 10 g and about 20 g, about 20 g and about 30 g, about 30 g and about 40 g, about 40 g and about 50 g, about 50 g and about 60 g, or over 60 g. In some embodiments, the effective amount of nutritional supplement is a serving of dry nutritional supplement weighing equal to or at least about: 1 g 10 g, 20 g, 30 g, 40 g, 50 g, 60 g, or ranges spanning and/or including the aforementioned values. The dry powder can be mixed with any suitable liquid (e.g. water, milk, juice) to form a solution or mixture that can be ingested. The dry powder could further be added to other food sources (e.g. addition to food recipes) or formulated as solid products (e.g. a bar, a gummy).

In some embodiments, the percentage by weight of BSG protein isolate in the dry nutritional supplement is equal to or at least about: 50%, 60%, 70%, 80%, 90%, values in between the aforementioned values, and otherwise. In some embodiments, the only source of protein in the nutritional supplement is BSG protein isolate. In other embodiments, where a mixture of different proteins is used, the BSG protein isolate accounts for equal to or at least about: 50%, 60%, 70%, 80%, 90%, values in between the aforementioned values, and otherwise of the protein provided.

In some embodiments of the methods described above, the nutritional supplement comprises less than about 95 mg of leucine per gram of BSG protein isolate. In some embodiments, the nutritional supplement comprises less than about 55 mg of lysine per gram of BSG protein isolate. In some embodiments of the method, the provided nutritional supplement comprises less than about 50 mg of isoleucine per gram of BSG protein isolate. In some embodiments, the nutritional supplement comprises less than about 60 mg of valine per gram of BSG protein isolate.

In some embodiments of the method, the provided nutritional supplement comprises between about 50 mg and about 60 mg alanine, between about 70 mg and 80 mg arginine, between about 80 mg and about 90 mg aspartic acid, between about 15 mg and about 25 mg cysteine, between about 170 mg and 180 mg of glutamic acid, about 40 mg and about 50 mg glycine, between about 15 mg and about 25 mg histidine, between about 35 mg about 45 mg isoleucine, between about 75 mg and about 95 mg of leucine, between about 25 mg and about 55 mg lysine, between about 25 mg and about 35 mg of methionine, between about 50 mg and about 60 mg phenylalanine, between about 40 and about 50 mg proline, between about 45 mg and about 55 mg serine, between about 30 mg and about 40 mg threonine, between about 10 mg and about 20 mg tryptophan, between about 45 mg and about 55 mg tyrosine, and between about 55 mg and about 65 mg of valine per gram of BSG protein isolate.

Some embodiments involve decreasing the Tmax of leucine in a subject by providing the nutritional supplements described above for ingestion by a subject. In some embodiments, the Tmax for leucine achieved using the nutritional supplements described above is less than about 30, 40, 50, 60, 70, 80, or 90 minutes. In some embodiments, the Tmax for leucine achieved using the nutritional supplements described above is between about 1 minute and about 30 minutes, about 30 minutes and about 40 minutes, about 40 minutes and about 50 minutes, about 50 minutes and about 60 minutes, about 60 minutes and about 70 minutes, about 70 minutes and about 80 minutes, about 80 minutes to about 90 minutes, or over 90 minutes. In some embodiments, the Tmax for leucine achieved using the nutritional supplements described above is between about 1 minute and about 90 minutes, about 30 minutes and about 90 minutes, about 40 minutes and about 80 minutes, or about 50 minutes and about 70 minutes. In some embodiments, the Tmax for leucine using the nutritional supplements described above is faster than the Tmax using a whey protein isolate.

EXAMPLES

Example 1

Starch Conversion: A colloid mill and pump was set up to recirculate through an agitated tank. Water was heated to 120° F. in the tank. BSG material was added. Enzyme Filtrase® NL is weighed and added to the tank. The materials were recirculated through colloid mill for 20 min @ 120° F., at which time the water was heated to 190° F. At that time, the pH was adjusted to 7.0-8.0 and Maximyl HT was added while recirculating through colloid mill. After a period of time, the water was cooled to 150° F. Additional water was added. The pH was adjusted to pH 10.5 using sodium hydroxide.

The solution was then filtered using a DSM screen, with recirculation of the filtrate back to the screen. The filtrate was then passed through a dairy filter for 30 min.

The pH of the filtrate was then adjusted to 4.4 with hydrochloric acid and heated to 122° F. At that time Cellulase A3 and Alpha Galactosidase DS30 was added with recirculation. At that time, Hemicellulase 90 was added with recirculation. The solution was then decanted. The filtrate was held. After which time the water was pumped off. To the sediment is added pH 4.4 water. The decanting was again performed. At that time, water is removed and the protein isolate dried.

Example 2

A 25 year old healthy male drinks a formulation comprising protein isolate from BSG as prepared in Example 1 reconstituted in water, 3-6 days per week, within about 1 hour before engaging in a balanced exercise program. After 1-2 weeks, he reports increased aerobic exercise performance, faster and more complete muscle recovery and improved muscle strength compared to engaging in the same exercise program without drinking the formulation before exercising.

Example 3

A 30 year old male drinks the same formulation described in Example 2 within about 1 hour after engaging in a daily balanced aerobic and resistance exercise program. He reports enhanced muscle performance and he is able to concentrate at work better than when he drinks a conventional exercise formulation. He also finds that he develops relatively less mental fatigue when combining exercise with the formulation of Example 2.

Example 4

A 44 year old female drinks the same formulation described in Example 2 during her daily balanced exercise program. She experiences less physical and mental fatigue during exercise and reports greater energy, endurance, and strength compared to drinking an exercise supplement that does not BSG based protein.

Conditional language used herein, such as, among others, "can," "could," "might," "may," "e.g.," and the like, unless specifically stated otherwise or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Further, while illustrative embodiments have been described, any embodiments having equivalent elements, modifications, omissions, and/or combinations are also within the scope of this disclosure. Moreover, although certain aspects, advantages, and novel features are described herein, not necessarily all such advantages may be achieved in accordance with any particular embodiment. For example, some embodiments within the scope of this disclosure achieve one advantage, or a group of advantages, as taught herein without necessarily achieving other advantages taught or suggested herein. Further, some embodiments may achieve different advantages than those taught or suggested herein.

What is claimed is:

1. A method of preparing protein isolate from a protein source, the method comprising the steps of:
   (a) preparing a mixture of a protein source in water;
   (b) treating the mixture with hydrogen peroxide; and
   (c) solubilizing the protein to provide a protein solution.

2. The method of claim 1, wherein the protein source is brewers' spent grain (BSG).

3. The method of claim 2, wherein the BSG comprises barley, malts, wheat, rice, flaxseed, coconut, corn, rye, pumpkin, hemp, pea, chia, lentil, fava, potato, sunflower, quinoa, amaranth, oat, sorghum, millet, or teff.

4. The method of claim 1, wherein the protein source is from pea.

5. The method of claim 1, wherein insoluble materials are removed from the protein solution of step (c) to form a protein filtrate or protein supernatant.

6. The method of claim 5, wherein the insoluble materials are removed by decantation or filtration.

7. The method of claim 5, wherein the protein filtrate or protein supernatant is acidified to a pH of from about 2.5 to about 6.5 to form a protein suspension.

8. The method of claim 7, wherein the protein is isolated from the protein suspension.

9. The method of claim 8, wherein the isolated protein is added to water to form a protein/water mixture for additional processing.

10. The method of claim 1, wherein the hydrogen peroxide treatment is for a period of less than 40 minutes.

11. The method of claim 1, wherein the hydrogen peroxide treatment is for a period of less than 10 minutes.

12. The method of claim 1, wherein the hydrogen peroxide treatment is performed at a temperature of from about 170° F. to about 195° F.

13. The method of claim 1, wherein the protein source is Whisky Spent Grain.

14. The method of claim 1, wherein the protein source is distillers dried grains with solubles (DDGS).

15. The method of claim 1, wherein the protein isolate has a PDCAAS score of at least 0.95.

* * * * *